United States Patent
Zhai et al.

(10) Patent No.: US 12,530,084 B2
(45) Date of Patent: Jan. 20, 2026

(54) GENERATING LOW FREQUENCY HAPTIC EFFECTS WITH NARROWBAND ACTUATORS

(71) Applicant: Google LLC, Mountain View, CA (US)

(72) Inventors: Shumin Zhai, Los Altos, CA (US); Scott Jenson, Palo Alto, CA (US); Hong Z. Tan, Lafayette, IN (US)

(73) Assignee: Google LLC, Mountain View, CA (US)

( * ) Notice: Subject to any disclaimer, the term of this patent is extended or adjusted under 35 U.S.C. 154(b) by 172 days.

(21) Appl. No.: 18/553,033

(22) PCT Filed: Mar. 31, 2021

(86) PCT No.: PCT/US2021/025099
§ 371 (c)(1),
(2) Date: Sep. 28, 2023

(87) PCT Pub. No.: WO2022/211801
PCT Pub. Date: Oct. 6, 2022

(65) Prior Publication Data
US 2024/0192779 A1    Jun. 13, 2024

(51) Int. Cl.
*G06F 3/01* (2006.01)
(52) U.S. Cl.
CPC .................................. *G06F 3/016* (2013.01)
(58) Field of Classification Search
None
See application file for complete search history.

(56) References Cited

U.S. PATENT DOCUMENTS

| 9,128,523 B2 * | 9/2015 | Buuck ..................... G06F 3/016 |
| 2007/0285216 A1 | 12/2007 | Tierling et al. |
| 2016/0034034 A1 | 2/2016 | Harris |
| 2018/0005496 A1 * | 1/2018 | Dogiamis .............. G04G 21/00 |
| 2018/0169702 A1 | 6/2018 | Houston et al. |
| 2018/0275759 A1 | 9/2018 | Alghooneh et al. |
| 2018/0299957 A1 * | 10/2018 | Israr ........................ G06F 3/011 |
| 2018/0335846 A1 | 11/2018 | Toma et al. |
| 2020/0103972 A1 * | 4/2020 | Amin-Shahidi ...... G06F 3/0346 |
| 2021/0359411 A1 * | 11/2021 | Hwang .................. H01Q 21/28 |
| 2022/0164043 A1 * | 5/2022 | Casset ................... B06B 1/0629 |
| 2024/0198216 A1 * | 6/2024 | Ranta ...................... G06F 3/016 |

OTHER PUBLICATIONS

Basdogan et al., "A Review of Surface Haptics: Enabling Tactile Effects on Touch Surfaces", IEEE Transactions on Haptics, Apr. 28, 2020, 21 pp.

(Continued)

*Primary Examiner* — Toan H Vu
(74) *Attorney, Agent, or Firm* — Shumaker & Sieffert, P.A.

(57) ABSTRACT

A computing device determines a haptic effect to be produced by a haptic device of the computing device. The computing device selects, based at least in part on the haptic effect, a modulation frequency. The computing device determines a combination of a carrier frequency and the modulation frequency to produce the haptic effect. The computing device drives the haptic device according to the combination of the carrier frequency and the modulation frequency to output a vibration pattern associated with the haptic effect.

20 Claims, 4 Drawing Sheets

(56) References Cited

OTHER PUBLICATIONS

Choi et al., "Transparent Film-Type Vibrotactile Actuator Array and Its Haptic Rendering Using Beat Phenomenon", Sensors, [Online], vol. 19, No. 16, Aug. 9, 2019, p. 3490, XP055873017, DOI: 10.3390/s19163490, Retrieved from the Internet: URL: https://pdfs.semanticscholar.org/788c/36cfea9ca1b5f22ef5371f79ec5dd5c1db1a.pdf.

International Search Report and Written Opinion of International Application No. PCT/US2021/025099, dated Jan. 4, 2022, 15 pp.

Lim et al., "Effect of Frequency Difference on Sensitivity of Beat Perception", Experimental Brain Research, Springer, Berlin, DE, vol. 26, No. 1, Oct. 25, 2011, pp. 11-19, XP019993436, ISSN: 1432-1106, DOI: 10.1007/S00221-011-2864-z.

* cited by examiner

GENERATING LOW FREQUENCY HAPTIC EFFECTS WITH NARROWBAND ACTUATORS

RELATED APPLICATIONS

This application is a national stage entry of WO International Patent Application No. PCT/US2021/025099, filed 31 Mar. 2021, the entire contents of which is incorporated herein by reference.

BACKGROUND

A computing device may use a haptic actuator to produce haptic feedback that can be felt by the user of the computing device. Haptic feedback refers to tactile or kinesthetic sensation created by a haptic actuator that applies forces, vibrations, or motions. A haptic actuator may operate at different vibrational frequencies to produce haptic effects associated with different tactile sensations. For example, a haptic actuator operating at a vibrational frequency at or above 200 Hertz (Hz) may produce haptic feedback associated with a smooth and somewhat penetrating tactile sensation, while a haptic actuator operating at a vibrational frequency at or below 60 Hz may produce haptic feedback associated with a breathing sensation, a flutter sensation, or a roughness sensation. A haptic actuator used in mobile computing devices such as smartphones may have a relatively narrow vibrational frequency band centered around 150 Hz, and thus may not be able to produce haptic feedback that is strong enough to be sensed by the user when the haptic actuator operates at a vibrational frequency below 60 Hz.

SUMMARY

In general, aspects of this disclosure are directed to techniques that enable haptic actuators of a computing device having a relatively narrow vibrational frequency band centered at a frequency above 100 Hz to produce haptic feedback associated with vibrational frequencies at or below 60 Hz that can be sensed by the user of the computing device. That is, the haptic actuators of a computing device may be able to operate at vibrational frequencies above 100 Hz to produce tactile sensations similar to those produced by a haptic actuator operating at vibrational frequencies below 60 Hz.

The techniques of this disclosure uses a beating phenomenon to enable a haptic actuator to produce tactile sensations similar to those produced by a haptic actuator operating at vibrational frequencies below 60 Hz. In the beating phenomenon, an interference pattern between two vibrations of slightly different frequencies can be perceived as a vibration pattern having a periodic variation in the vibration intensity, and where the frequency of the periodic variation in the vibration intensity of the vibration pattern may be the difference between the two frequencies. For example, interference between a vibration of 170 Hz and a vibration of 180 Hz may produce a vibration pattern having a periodic variation in the vibration intensity at a frequency of 10 Hz.

A computing device may use the beating phenomenon to produce haptic feedback associated with vibrational frequencies at or below 60 Hz by selecting a carrier frequency and a modulation frequency to modulate the amplitude of the carrier frequency to produce vibration patterns having periodic variations in the vibration intensity at frequencies between 0 Hz and 60 Hz. For example, the computing device may select a carrier frequency that is within the vibrational frequency band of the haptic device of the computing device, and may select a modulation frequency that is between 0 Hz and 30 Hz.

The computing device may determine two slightly different frequencies based on the carrier frequency and the modulation frequency, such as by determining a first frequency that is the sum of the carrier frequency and the modulation frequency, and determining a second frequency that is the carrier frequency subtracted by the modulation frequency. The computing device may mix the first frequency and the second frequency to generate a vibration pattern having periodic variations in the vibration intensity at a frequency that is the difference between the first frequency and the second frequency, thereby enabling haptic device of the computing device to produce haptic feedback associated with vibrational frequencies at or below 60 Hz.

The techniques of this disclosure enable haptic actuators to be able to produce haptic feedback associated with vibrational frequencies at or below 60 Hz while operating at vibrational frequencies above 100 Hz. As such, the techniques may enable haptic actuators that are unable to produce haptic feedback that is strong enough to be perceived by the user when operating at vibrational frequencies below 100 Hz to be able to produce haptic feedback associated with vibrational frequencies at or below 60 Hz that is strong enough to be perceived by the user, thereby solving one or more technical problems and providing one or more technical advantages.

In one example, the disclosure is directed to a method that includes determining, by one or more processors of a computing device, a haptic effect to be produced by a haptic device of the computing device; selecting, by the one or more processors and based at least in part on the haptic effect, a modulation frequency; determining, by the one or more processors, a combination of a carrier frequency and the modulation frequency to produce the haptic effect; and driving, by the one or more processors, the haptic device according to the combination of the carrier frequency and the modulation frequency to output a vibration pattern associated with the haptic effect.

In another example, the disclosure is directed to a computing device. The computing device includes a haptic device, a memory, and one or more processors configured to: determine a haptic effect to be produced by the haptic device; select, based at least in part on the haptic effect, a modulation frequency; determine a combination of a carrier frequency and the modulation frequency to produce the haptic effect; and drive the haptic device according to the combination of the carrier frequency and the modulation frequency to output a vibration pattern associated with the haptic effect.

In another example, the disclosure is directed to a non-transitory computer-readable storage medium storing instructions that, when executed, cause one or more processors of a computing device to: determine a haptic effect to be produced by a haptic device of the computing device; select, based at least in part on the haptic effect, a modulation frequency; determine a combination of a carrier frequency and the modulation frequency to produce the haptic effect; and drive the haptic device according to the combination of the carrier frequency and the modulation frequency to output a vibration pattern associated with the haptic effect.

In another example, the disclosure is directed to an apparatus that includes means for determining a haptic effect to be produced by a haptic device of the apparatus; means for selecting, based at least in part on the haptic effect, a modulation frequency; means for determining a combination of a carrier frequency and the modulation frequency to produce the haptic effect; and means for driving the haptic device according to the combination of the carrier frequency and the modulation frequency to output a vibration pattern associated with the haptic effect.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
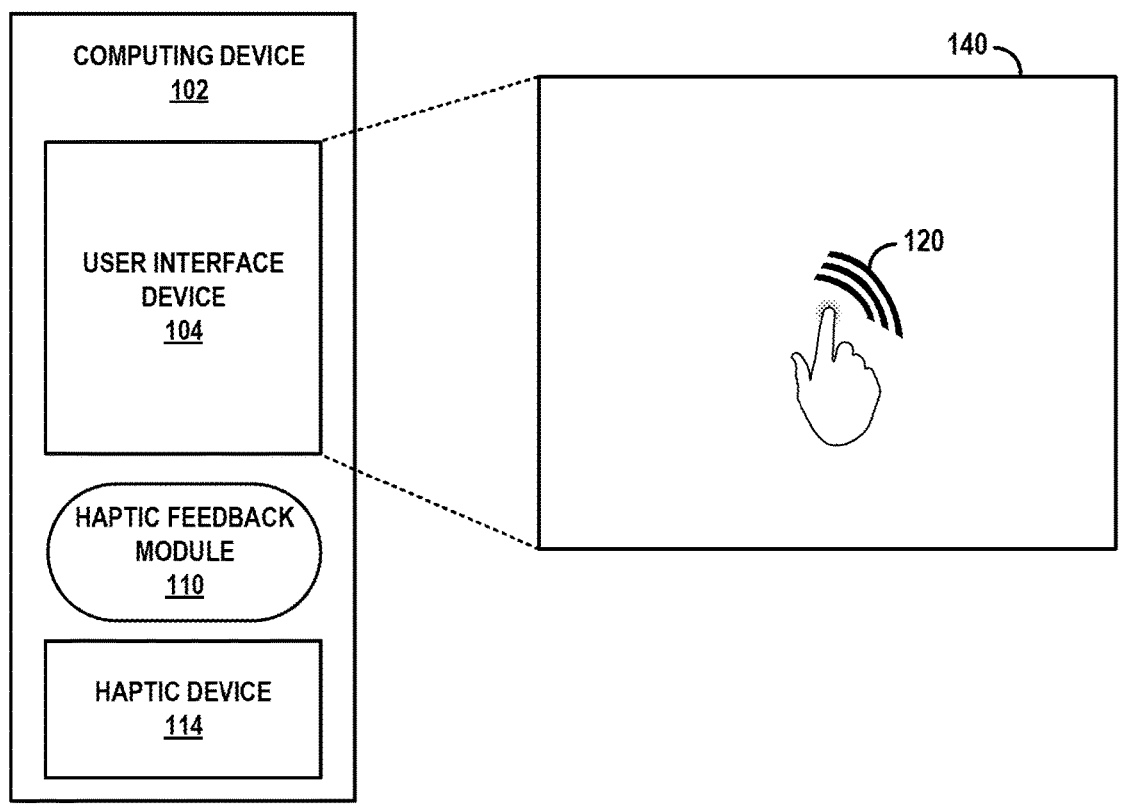
FIG. 1 is a conceptual diagram illustrating an example computing device 102 configured to output haptic feedback, in accordance with one or more aspects of the present disclosure.

FIG. 1 is a conceptual diagram illustrating an example computing device 102 configured to output haptic feedback, in accordance with one or more aspects of the present disclosure. As shown in FIG. 1, computing device 102 is a mobile computing device (e.g., a mobile phone). However, in other examples, computing device 102 may be a tablet computer, a laptop computer, a desktop computer, a gaming system, a media player, an e-book reader, a television platform, an automobile navigation system, a wearable computing device (e.g., a computerized watch, computerized eyewear, a computerized glove), or any other type of mobile or non-mobile computing device.

Computing device 102 includes a user interface device (UID) 104. UID 104 of computing device 102 may function as an input device for computing device 102 and as an output device for computing device 102. UID 104 may be implemented using various technologies. For instance, UID 104 may function as an input device using a presence-sensitive input screen, such as a resistive touchscreen, a surface acoustic wave touchscreen, a capacitive touchscreen, a projective capacitive touchscreen, a pressure sensitive screen, an acoustic pulse recognition touchscreen, or another presence-sensitive display technology. UID 104 may function as an output (e.g., display) device using any one or more display devices, such as a liquid crystal display (LCD), dot matrix display, light emitting diode (LED) display, microLED, organic light-emitting diode (OLED) display, e-ink, or similar monochrome or color display capable of outputting visible information to a user of computing device 10.

UID 104 of computing device 102 may include a presence-sensitive display that may receive tactile input from a user of computing device 102. UID 104 may receive indications of the tactile input by detecting one or more gestures from a user of computing device 102 (e.g., the user touching or pointing to one or more locations of UID 104 with a finger or a stylus pen). UID 104 may present output to a user, for instance at a presence-sensitive display. UID 104 may present the output as a graphical user interface (e.g., user interface 140), which may be associated with functionality provided by computing device 102. For example, UID 104 may present various user interfaces of components of a computing platform, operating system, applications, or services executing at or accessible by computing device 102 (e.g., an electronic message application, an Internet browser application, a mobile operating system, etc.). A user may interact with a respective user interface to cause computing device 102 to perform operations relating to a function.

Computing device 102 includes haptic device 114 configured to provide haptic feedback 120 to a user of computing device 102. Haptic device 114 may include one or more haptic actuators, such as linear resonant actuators, eccentric rotating mass vibration motors, piezoelectric transducers, electromechanical devices, and/or other vibrotactile actuators, and drive electronics coupled to the one or more actuators. The drive electronics may cause the one or more haptic actuators to induce a selected vibratory response into at least a portion of the computing device 102, thereby providing haptic feedback in the form of a tactile sensation to a user of computing device 102.

Haptic device 114 may output patterns of vibrations (also referred to as "vibration patterns") associated with different haptic effects to produce various tactile sensations to a user. For example, haptic device 114 may output a vibration pattern associated with a fluttery haptic effect to produce a fluttery tactile sensation to the user, output a vibration pattern associated with a grainy haptic effect to produce a grainy tactile sensation to the user, or output a vibration pattern associated with a rough haptic effect to produce a rough tactile sensation to the user.

A vibration pattern may be associated with a vibration frequency, which may be the number of vibrations outputted by haptic device 114 within a specified time period, and may also be associated with a set of vibration intensities that specify the intensities of the vibrations outputted by haptic device 114. Different vibration patterns associated with different haptic effects may have different associated vibration frequencies and different sets of vibration intensities.

In some examples, computing device 102 may associate haptic effects with various user interface interactions. As the user provides user input to interact with the user interface presented by UID 104, computing device 102 may determine the haptic effect to be produced based on the user interactions with the user interface presented by UID 104, computing device 102, and haptic device 114 may output vibration patterns associated with the haptic effects to produce tactile sensations that can be felt by the user. For example, computing device 102 may, in response to receiving user input to select a button in the user interface, produce a haptic effect associated with the button being selected, or may, in response to receiving user input that corresponds to a gesture to scroll through a list of items in the user interface, produce a haptic effect associated with the scrolling.

In some examples, computing device 102 may associate haptic effects with the occurrence of events at computing device 102. For example, computing device 102 may select haptic effects to be produced in response to computing device 102 receiving a phone call or a text message, in response to a payment transaction being accepted or declined, in response to the occurrence of an alarm or a reminder, and the like. Computing device 102 may, in response to determining that an event has occurred, determine the haptic effect associated with the event and may output a vibration pattern associated with the haptic effect.

In some examples, vibration patterns associated with different haptic effects may be associated with different frequencies, and one or more haptic actuators of haptic device 114 may operate at different frequencies to output vibration patterns associated with different haptic effects. Certain haptic effects are associated with vibration patterns having frequencies of 60 Hz or less. For example, a breathing or heartbeat haptic effect may be associated with a vibration pattern having a frequency that is less than 1 Hz, a fluttery haptic effect may be associated with a vibration pattern having a frequency that is between 0 Hz and 20 Hz, a grainy haptic effect may be associated with a vibration pattern having a frequency that is between 15 Hz and 40 Hz, and a rough haptic effect may be associated with a vibration pattern having a frequency that is between 30 Hz and 60 Hz.

However, haptic actuators used in computing devices, such as the haptic actuators of haptic device 114, may not be able to output vibrations that are strong enough to be sensed by the user when operating at a vibrational frequency below 60 Hz. As such, haptic device 114 may be unable to produce certain haptic effects associated with vibration patterns having frequencies that are below 60 Hz in ways that can be sensed by the user of computing device 102 by simply operating at a vibrational frequency that is below 60 Hz.

In accordance with aspects of this disclosure, haptic device 114 of computing device 102 may be able to operate at vibrational frequencies above 100 Hz to produce haptic effects associated with vibrational frequencies at or below 60 Hz that can be sensed by the user of the computing device. That is, haptic device 114 of computing device 102 may be able to output a vibration pattern at a frequency above 100 Hz to produce a haptic effect having a tactile sensation of vibrating at or below 60 Hz.

To that end, computing device 102 may include haptic feedback module 110 that may be able to determine vibration patterns at frequencies above 100 Hz that, when outputted by haptic device 114, produces haptic effects having tactile sensations of vibrating at or below 60 Hz. Haptic feedback module 110 may perform operations described using software, hardware, firmware, or a mixture of hardware, software, and firmware residing in and/or executing at computing device 102. Computing device 102 may execute haptic feedback module 110 with one or more processors. Computing device 102 may execute haptic feedback module 110 as a virtual machine executing on underlying hardware. Haptic feedback module 110 may execute as a service or component of an operating system or computing platform. Haptic feedback module 110 may execute as one or more executable programs at an application layer of a computing platform.

Haptic feedback module 110 may perform functions associated with determining a vibration pattern to be outputted by haptic device 114 producing a haptic effect and interfacing with haptic device 114 to enable haptic device 114 to output the determined vibration pattern to produce the haptic effect. Haptic feedback module 110 may determine the haptic effect to be produced by haptic device 114 by receiving an indication of the haptic effect to be produced by haptic device 114. For example, haptic feedback module 110 may receive an indication of a function call invoked by an application executing at computing device 102, and haptic feedback module 110 may determine a haptic effect associated with the function call. In some examples, each of a plurality different haptic effects may be associated with a unique key, such as a unique alphanumeric value, and haptic feedback module 110 may, in response to receiving an indication of a key, determine the haptic effect associated with the key.

Haptic feedback module 110 may, in response to determining the haptic effect to be produced by haptic device 114, determine a vibration pattern at a carrier frequency that, when outputted by haptic device 114, produces the determined haptic effect having tactile sensations of vibrating at or below 60 Hz. As such, haptic feedback module 110 may select a carrier frequency for the vibration pattern and may select a modulation frequency to modulate the amplitude of the carrier frequency over time to produce the determined haptic effect that delivers a distinct tactile sensation associated with periodic variations in the vibration intensity at frequencies below 60 Hz.

Haptic feedback module 110 may select a frequency that is within the resonance range of the haptic actuators of haptic device 114 as the carrier frequency of the vibration pattern. That is, haptic feedback module 110 may determine the carrier frequency to be a vibration frequency that can be outputted by haptic device 114 at a vibration intensity that is strong enough to be sensed by the user of computing device 102. In some examples, haptic feedback module 110 may determine the carrier frequency to be a frequency that is above 100 Hz.

Haptic feedback module 110 may select a modulation frequency to modulate the amplitude of the carrier frequency based at least in part on the determined haptic effect. As described above, a haptic effect may be associated with a tactile sensation of vibrations at or below 60 Hz. For example, a fluttery haptic effect may be associated with a tactile sensation of vibrations having a frequency (referred to herein as "vibration frequency") that is between 0 Hz and 20 Hz, a grainy haptic effect may be associated with a tactile sensation of vibrations having a frequency that is between 15 Hz and 40 Hz, and a rough haptic effect may be associated with a tactile sensation of vibrations having a frequency that is between 30 Hz and 60 Hz.

Haptic feedback module 110 may select a modulation frequency based on the haptic effect by selecting a modulation frequency that corresponds to the vibration frequency of the tactile sensation associated with the haptic effect. In some examples, haptic feedback module 110 may select a modulation frequency that is half of the vibration frequency of the tactile sensation associated with the haptic effect. For example, for a fluttery haptic effect associated with a tactile sensation having a vibration frequency between 0 Hz and 20 Hz, haptic feedback module 110 may select a modulation frequency that is between about 0 Hz and 10 Hz. Similarly, for a grainy haptic effect associated with a tactile sensation having a vibration frequency between 15 Hz and 40 Hz, haptic feedback module 110 may select a modulation frequency that is between about 8 Hz and 20 Hz, and for a rough haptic effect associated with a tactile sensation having a vibration frequency between 30 Hz and 60 Hz, haptic feedback module 110 may select a modulation frequency that is between about 15 Hz and 30 Hz.

Haptic feedback module 110 may determine a mix of the carrier frequency and the modulation frequency to determine the vibration pattern that produces the determined haptic effect having tactile sensations of vibrating at or below 60 Hz. As described above, a beating phenomenon indicates that two slightly different frequencies, when mixed, may produce an interference pattern perceived as a periodic variation in intensity at a frequency that is the difference between the two frequencies. As such, haptic feedback module 110 may determine two frequencies based on the carrier frequency and the modulation frequency, where the difference between the two frequencies may correspond to the vibration frequency of the tactile sensation associated with the determined haptic effect.

Haptic feedback module 110 may determine a first frequency as the sum of the carrier frequency F and the modulation frequency ΔF, and may determine a second frequency as the difference between the carrier frequency F and the modulation frequency ΔF (i.e., determine the second frequency as a subtraction of the modulation frequency ΔF from the carrier frequency F). For example, for a modulation frequency ΔF of 5 Hz and a carrier frequency F of 150 Hz, haptic feedback module 110 may determine the first frequency as 150+5=155 Hz and may determine the second frequency as 150−5=145 Hz. The difference between the first frequency of 155 and the second frequency of 145 is 10 Hz, which may be the vibration frequency of the tactile sensation associated with the determined haptic effect.

Haptic feedback module 110 may mix the first frequency with the second frequency to determine the combination of the carrier frequency and the modulation frequency to produce the haptic effect. For example, haptic feedback module 110 may add the first frequency and the second frequency by superimposing a first wave associated with the first frequency with a second wave associated with the second frequency to form a resultant wave that represents an associated vibration pattern of the haptic effect. That is, the frequency of the resultant wave may be the frequency of the associated vibration pattern, and the amplitudes in the resultant wave may correspond to the vibration intensities of the associated vibration pattern.

Given the first frequency $f_1$, a sinusoidal wave associated with the first frequency $f_1$ with a peak amplitude A as a function of time t may be $A*\sin(2\pi f_1 t)$ or $A*\cos(2\pi f_1 t)$, which may represent an associated vibration pattern of frequency $f_1$. Similarly, given the second frequency $f_2$, a sinusoidal wave associated with the second frequency $f_2$ with a peak amplitude A as a function of time t may be $A*\sin(2\pi f_2 t)$ or $A*\cos(2\pi f_2 t)$, which may represent an associated vibration pattern of frequency $f_2$. Thus, haptic feedback module 110 may mix the first frequency and the second frequency by adding the sinusoidal wave associated with the first frequency with the sinusoidal wave of the second frequency, such as $\sin(2\pi f_1 t)+\sin(2\pi f_2 t)$, or $\cos(2\pi f_1 t)+\cos(2\pi f_2 t)$ to form the resultant wave.

Mathematically, $A*\cos(2\pi f_1 t)+A*\cos(2\pi f_2 t)=2A*\cos(2\pi F t)*\cos(2\pi \Delta F t)$. The left side of this equation, which is the wave resulting from adding a first wave associated with the first frequency $f_1$ with a second wave associated with the second frequency $f_2$, shows two sinusoidal vibrations with the same amplitude A being mixed (e.g., added), where $f_1$=carrier frequency F+modulation frequency ΔF and $f_2$=carrier frequency F−modulation frequency ΔF. The right side of this equation shows that the sum of the two sinusoidal vibrations is equal to an amplitude-modulated vibration with an amplitude of 2*A, a modulation frequency of ΔF, and a carrier frequency of F.

Haptic feedback module 110 may drive haptic device 114 according to the combination of the carrier frequency and the modulation frequency to output a vibration pattern that produces the haptic effect. As described above, haptic feedback module 110 may mix (e.g., add) a sinusoidal wave of carrier frequency F plus modulation frequency ΔF with a sinusoidal wave of carrier frequency F minus modulation frequency ΔF to generate a resulting wave that represents the associated vibration pattern that produces the haptic effect. The amplitude of the wave resulting from mixing the sinusoidal wave of carrier frequency F plus modulation frequency ΔF with the sinusoidal wave of carrier frequency F minus modulation frequency ΔF may correspond to the vibration intensities of the associated vibration pattern. Thus, at a point in time, the intensity (i.e., strength) of the vibration may correspond to the value of the amplitude of the wave at the point in time, such that a relatively higher amplitude may correspond to a relatively higher intensity of the vibration outputted by haptic device 114 and a relatively lower amplitude may correspond to a relatively lower intensity of the vibration outputted by haptic device 114.

The resulting wave that represents the associated vibration pattern may indicate a vibration frequency that is equal to the carrier frequency. For example, if the carrier frequency is 150 Hz, then the vibration pattern may also indicate a vibration frequency. The resulting wave may also include a plurality of distinct bumps, where each distinct bump is a group of one or more wave amplitudes that are above an amplitude threshold (e.g., 80% of the peak amplitude, 90% of the peak amplitude, etc.), and where the distinct bumps are separated from each other by a group of one or more wave amplitudes that are below the amplitude threshold. The frequency of the distinct bumps in the resulting wave may be the same as the vibration frequency of the tactile sensation associated with the determined haptic effect, and as such may be twice the modulation frequency. Thus, for a carrier frequency of 150 Hz and a modulation frequency of 25 Hz, the resulting wave may indicate 150 vibrations are to be outputted per second, and there may be 50 distinct bumps in the 150 vibrations outputted each second, thereby providing a tactile sensation of vibrations at 50 Hz within the 150 Hz of vibrations outputted by haptic device 114. As haptic device 114 outputs the vibration pattern over time, a user of computing device 102 may be able to clearly perceive both the distinct sensation associated with the relatively lower frequency associated with the determined haptic effect as well as the smooth vibration of the relatively higher carrier frequency.

Haptic feedback module 110 may use the wave representing the vibration pattern to drive haptic device 114 to output the haptic effect. The haptic actuators of haptic device 114 may vibrate at the carrier frequency. As the haptic actuators of haptic device 114 vibrates, haptic device 114 may follow the vibration pattern to determine the vibration intensity for each vibration and may drive the haptic actuators of haptic device 114 to vibrate at the determined vibration intensity. In this way, the haptic actuators of haptic device 114 may vibrate at the carrier frequency at varying vibration intensities as modulated by the modulation frequency to output the haptic effect.

Figure 2:
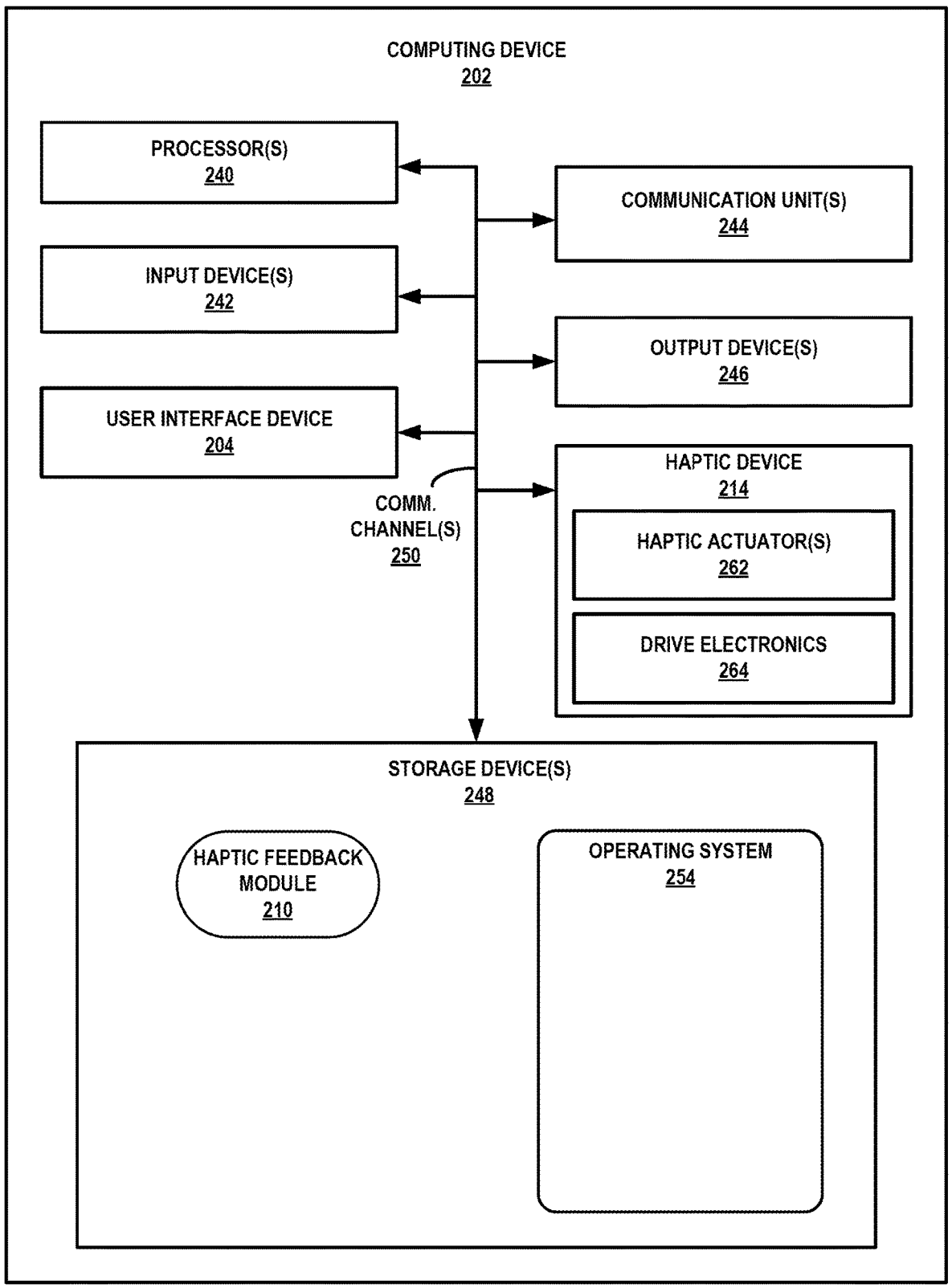
FIG. 2 is a block diagram illustrating an example computing device, in accordance with one or more aspects of the present disclosure.

FIG. 2 is a block diagram illustrating an example computing device 202, in accordance with one or more aspects of the present disclosure. Computing device 202 of FIG. 2 is an example of computing device 102 of FIG. 1. Computing device 202 is only one particular example of computing device 102 of FIG. 1, and many other examples of computing device 102 may be used in other instances. In the example of FIG. 2, computing device 202 may be a wearable computing device, a mobile computing device (e.g., a smartphone), or any other computing device. Computing device 202 of FIG. 2 may include a subset of the components included in example computing device 202 or may include additional components not shown in FIG. 2.

As shown in the example of FIG. 2, computing device 202 includes user interface device 204 ("UID 204"), one or more processors 240, one or more input devices 242, one or more communication units 244, one or more output devices 246, one or more storage devices 248, and haptic device 214. Storage devices 248 of computing device 202 also include operating system 254 and haptic feedback module 210.

Communication channels 250 may interconnect each of the components 240, 242, 244, 246, 248, 204, and 214 for inter-component communications (physically, communicatively, and/or operatively). In some examples, communication channels 250 may include a system bus, a network connection, an inter-process communication data structure, or any other method for communicating data.

One or more input devices 242 of computing device 202 may be configured to receive input. Examples of input are tactile, audio, and video input. Input devices 242 of computing device 202, in one example, includes a presence-sensitive display, touch-sensitive screen, mouse, keyboard, voice responsive system, video camera, microphone or any other type of device for detecting input from a human or machine.

One or more output devices 246 of computing device 202 may be configured to generate output. Examples of output are tactile, audio, and video output. Output devices 246 of computing device 202, in one example, includes a presence-sensitive display, sound card, video graphics adapter card, speaker, cathode ray tube (CRT) monitor, liquid crystal display (LCD), or any other type of device for generating output to a human or machine.

One or more communication units 244 of computing device 202 may be configured to communicate with external devices via one or more wired and/or wireless networks by transmitting and/or receiving network signals on the one or more networks. Examples of communication unit 244 include a network interface card (e.g. such as an Ethernet card), an optical transceiver, a radio frequency transceiver, a GPS receiver, or any other type of device that can send and/or receive information. Other examples of communication units 44 may include short wave radios, cellular data radios, wireless network radios, as well as universal serial bus (USB) controllers.

In some examples, UID 204 of computing device 202 may include functionality of input devices 242 and/or output devices 246. In the example of FIG. 2, UID 204 may be or may include a presence-sensitive input device. In some examples, a presence sensitive input device may detect an object at and/or near a screen. As one example range, a presence-sensitive input device may detect an object, such as a finger or stylus that is within 2 inches or less of the screen. The presence-sensitive input device may determine a location (e.g., an (x,y) coordinate) of a screen at which the object was detected. In another example range, a presence-sensitive input device may detect an object six inches or less from the screen and other ranges are also possible. The presence-sensitive input device may determine the location of the screen selected by a user's finger using capacitive, inductive, and/or optical recognition techniques. In some examples, a presence sensitive input device also provides output to a user using tactile, audio, or video stimuli as described with respect to output device 246, e.g., at a display. In the example of FIG. 2, UID 204 may present a user interface.

While illustrated as an internal component of computing device 202, UID 204 also represents an external component that shares a data path with computing device 202 for transmitting and/or receiving input and output. For instance, in one example, UID 204 represents a built-in component of computing device 202 located within and physically connected to the external packaging of computing device 202 (e.g., a screen on a mobile phone). In another example, UID 204 represents an external component of computing device 202 located outside and physically separated from the packaging of computing device 202 (e.g., a monitor, a projector, etc. that shares a wired and/or wireless data path with a tablet computer).

Haptic device 214 of computing device 202 is an example of haptic device 114 of FIG. 1 and may be configured to output haptic feedback, such as in the form of vibrations, that can be felt by users of computing device 202 that hold computing device 202 and/or that touch an external surface of the enclosure of computing device 202. Haptic device 214 includes one or more haptic actuators 262 and drive electronics 264.

One or more haptic actuators 262 may include one or more linear resonant actuators, one or more eccentric rotating mass vibration motors, one or more piezoelectric transducers, one or more electromechanical devices, and/or other vibrotactile actuators that may create motion (e.g., vibrate) to impart information to the user of computing device 202 through the user's sense of touch. For example, a linear resonant actuator may vibrate by moving a mass in a reciprocal manner by means of a magnetic voice coil.

Drive electronics 264 may be circuitry coupled to one or more haptic actuators 262 to cause one or more haptic actuators 262 to vibrate to induce a selected vibratory response into at least a portion of the computing device 102, thereby providing a tactile sensation to a user of computing device 102. Drive electronics 264 may, in response to haptic device 214 receiving an indication of a vibration pattern, drive one or more haptic actuators 262 to vibrate according to the vibration pattern. That is, drive electronics 264 may drive one or more haptic actuators 262 at the frequency and at the vibration intensities associated with the vibration pattern.

One or more storage devices 248 within computing device 202 may store information for processing during operation of computing device 202. In some examples, storage device 248 is a temporary memory, meaning that a primary purpose of storage device 248 is not long-term storage. Storage devices 248 on computing device 202 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 248, in some examples, also include one or more computer-readable storage media. Storage devices 248 may be configured to store larger amounts of information than volatile memory. Storage devices 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 248 may store program instructions and/or information (e.g., data) associated with haptic feedback module 210 and operating system 254.

One or more processors 240 may implement functionality and/or execute instructions within computing device 202. For example, processors 240 on computing device 202 may receive and execute instructions stored by storage devices 248 that execute the functionality of haptic feedback module

210. These instructions executed by processors 240 may cause haptic device 214 of computing device 202 to output a vibration pattern to produce a haptic effect.

In accordance with techniques of this disclosure, haptic feedback module 210 may determine the haptic effect to be outputted by haptic device 214. A haptic effect is a pattern of vibrations (also referred to as "vibration pattern") outputted by haptic device 214 that produces a distinct tactile sensation associated with the haptic effect that is felt by the skin of a user that is in contact with a portion of computing device 202. For example, haptic device 214 may output a haptic effect associated with a fluttery sensation that produces a fluttery tactile sensation as felt by a user, a haptic effect associated with a grainy sensation that produces a grainy tactile sensation as felt by a user, or a haptic effect associated with a rough sensation that produces a rough tactile sensation when felt by the user.

The haptic effects described above, such as the haptic effect associated with a fluttery, grainy, or rough sensations may typically be associated with vibration frequencies below 60 Hz. That is, a haptic actuator that is able to reliably vibrate at 100 Hz and below may be able to output the haptic effect associated with a fluttery, grainy, or rough sensation by vibrating at or below 60 Hz. However, because one or more haptic actuators 262 may be unable to reliably vibrate at or below 100 Hz, haptic device 214 may combine a modulation frequency with a carrier frequency, such as by mixing the modulation frequency with the carrier frequency or by multiplying the modulation frequency with the carrier frequency, to generate a vibration pattern having a frequency that is within the resonance range (e.g., greater than 100 Hz) of one or more haptic actuators 262, and one or more haptic actuators 262 may output the generated vibration pattern to produce a desired haptic effect associated with vibration frequencies below 60 Hz.

Haptic feedback module 210 may select a modulation frequency based at least in part on the haptic effect. To produce the haptic effect that is associated with vibration frequencies below 60 Hz, haptic feedback module 210 may select a modulation frequency that is between 0 and 30 Hz. In some examples, each haptic effect may be associated with a range of modulation frequencies. For example, the fluttery sensation may be associated with a modulation frequency of between 0 and 10 Hz, the grainy sensation may be associated with a modulation frequency between 8 and 20 Hz, and the rough sensation may be associated with a modulation frequency between 15 and 30 Hz.

Haptic feedback module 210 may, along with selecting a modulation frequency, also select a carrier frequency. The carrier frequency may enhance the tactile sensation of the haptic effect. For example, a carrier frequency at 120 Hz may, for a modulation frequency at 6 Hz, cause the tactile sensation of the vibration pattern outputted by one or more haptic actuators 262 to feel softer compared with a carrier frequency at 240 Hz, which may cause the tactile sensation of the vibration pattern outputted by one or more haptic actuators 262 to feel incompatible and broken. In another example, a carrier frequency at 240 Hz may, for a modulation frequency at 14 Hz, cause the tactile sensation of the vibration pattern outputted by one or more haptic actuators 262 to feel delicate and grainy.

Haptic feedback module 210 may determine a combination of the modulation frequency with the carrier frequency to determine the vibration pattern that produces the haptic effect. Specifically, by determining a combination of the modulation frequency with the carrier frequency, haptic feedback module 210 may generate a vibration pattern having a periodic (i.e., regular and repeating) pattern of vibration intensity over time that, when outputted by one or more haptic actuators 262 of haptic device 214, produces the tactile sensation associated with the haptic effect, such as a tactile sensation of a vibration frequency that is at or below 60 Hz.

To determine a combination of the modulation frequency with the carrier frequency to determine the vibration pattern associated with the haptic effect, haptic feedback module 210 may generate two slightly different frequencies using the modulation frequency and the carrier frequency, and may mix the two different frequencies to determine a vibration pattern that is perceived as a periodic variation in vibration intensity at a frequency that is the difference between the two frequencies.

Haptic feedback module 210 may determine a first frequency $f_1$ based on the carrier frequency F and the modulation frequency $\Delta F$ and a second frequency $f_2$ based on the carrier frequency F and the modulation frequency $\Delta F$, and may mix the first frequency $f_1$ with the second frequency $f_2$. Specifically, haptic feedback module 210 may determine a first frequency $f_1$ as the sum of the carrier frequency F and the modulation frequency $\Delta F$ ($f_1$=F+$\Delta F$), and may determine a second frequency as the difference between the carrier frequency F and the modulation frequency $\Delta F$ ($f_2$=F−$\Delta F$).

Haptic feedback module 210 may mix the first frequency with the second frequency to determine the combination of the carrier frequency and the modulation frequency to produce the haptic effect. For example, haptic feedback module 210 may add the first frequency and the second frequency, such as by adding a sinusoidal wave representing the first frequency over time with a sinusoidal wave representing the second frequency to form a resultant wave that represents the vibration pattern over time that, when outputted by one or more haptic actuators 262 of haptic device 214, produces the tactile sensation associated with the haptic effect. That is, the frequency of the resultant wave may be the frequency of the associated vibration pattern, and the amplitude of the resultant wave at any point in time may correspond to the vibration intensity of the vibration at the point in time.

Given the first frequency $f_1$, a sinusoidal wave associated with the first frequency $f_1$ with a peak amplitude A as a function of time t may be represented mathematically as $A*\sin(2\pi f_1 t)$ or $A*\cos(2\pi f_1 t)$, which may represent an associated vibration pattern. Similarly, given the second frequency $f_2$, a sinusoidal wave associated with the second frequency $f_2$ with a peak amplitude A as a function of time t may be represented mathematically as $A*\sin(2\pi f_2 t)$ or $A*\cos(2\pi f_2 t)$, which may represent an associated vibration pattern. Thus, haptic feedback module 210 may mix the first frequency and the second frequency by adding the sinusoidal wave associated with the first frequency with the sinusoidal wave of the second frequency, such as $\sin(2\pi f_1 t)+\sin(2\pi f_2 t)$, or $\cos(2\pi f_1 t)+\cos(2\pi f_2 t)$ to form the resultant wave that represents the vibration pattern.

Haptic feedback module 210 may drive haptic device 214 according to the combination of the carrier frequency and the modulation frequency to output the haptic effect. As described above, haptic feedback module 100 may mix (e.g., add) a sinusoidal wave of the first frequency $f_1$ with a sinusoidal wave of the second frequency $f_2$ to generate a resulting wave that represents the associated vibration pattern of the haptic effect. Thus, to drive haptic device 214 according to the combination of the carrier frequency and the modulation frequency to output the haptic effect, haptic feedback module 110 may drive or otherwise interact with haptic device 214 to cause haptic device 214 to output the vibration pattern represented by the resulting wave.

The amplitude of the wave resulting from adding the sinusoidal wave of the first frequency $f_1$ with the sinusoidal wave of the second frequency $f_2$ may correspond to the vibration intensities of the associated vibration pattern. Thus, at any point in time, the intensity (i.e., strength) of the vibration may correspond to the amplitude of the resulting wave at the point in time, such that a relatively higher amplitude may correspond to a relatively higher intensity of the vibration outputted by haptic device 214 and a relatively lower amplitude may correspond to a relatively lower intensity of the vibration outputted by haptic device 214.

The vibration pattern represented by the resulting wave with the resulting wave may indicate a vibration frequency that is equal to the carrier frequency. The vibration pattern may also indicate the vibration intensity of each of the vibrations. The vibration intensities indicated by the vibration pattern may form a plurality of distinct bumps, where each distinct bump is a grouping of vibrations having vibration intensities that are at or above a vibration intensity threshold. Such a vibration intensity threshold may correspond to a percentage of the peak vibration intensity indicated by the vibration pattern, such as 50% of the peak vibration intensity, 60% of the peak vibration intensity, and the like. The plurality of distinct bumps are separated from each other in the vibration pattern by one or more vibrations having vibration intensities that are below the vibration intensity threshold, and the frequency of the distinct bumps in the vibration pattern may be the same as the vibration frequency of the tactile sensation associated with the determined haptic effect, which may be twice the modulation frequency. It may take up to two distinct bumps to be produced by haptic device 214 in order for the haptic effect to become apparent to the user.

In some examples, haptic feedback module 210 may send an indication of a vibration pattern associated with the wave resulting from mixing a sinusoidal wave of the first frequency $f_1$ with a sinusoidal wave of the second frequency $f_2$ to haptic device 214, and haptic device 214 may, in response to receiving the vibration pattern, output the indicated vibration pattern. The vibration pattern may specify the frequency of the vibrations in the vibration pattern (e.g., the carrier frequency) and may specify, for each vibration in a period (e.g., 1 second), the vibration strength of the vibration. Haptic device 214 may therefore drive one or more haptic actuators 262 to output the indicated vibration pattern to produce the haptic effect.

In some examples, rather than selecting a single modulation frequency and selecting a single carrier frequency, haptic feedback module 210 may vary the modulation frequency and/or the single carrier frequency over time to generate varying tactile sensations. For example, haptic feedback module 210 may select a modulation frequency and increase the modulation frequency over time, so that haptic device 214 may start producing a fluttery tactile sensation that over time changes to a grainy tactile sensation then a rough tactile sensation. Producing such varying tactile sensations may be similar to the effect of a chirp signal by sweeping the frequency at a low-frequency range (e.g., at or below 60 Hz).

Figure 3:
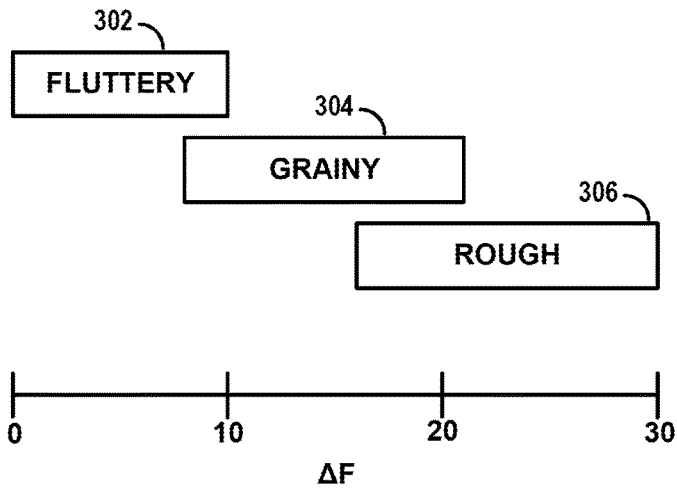
FIG. 3 is a conceptual diagram illustrating example ranges of modulation frequencies associated with example haptic effects, in accordance with aspects of this disclosure.

FIG. 3 is a conceptual diagram illustrating example ranges of modulation frequencies associated with example haptic effects, in accordance with aspects of this disclosure. As described above, a modulation frequency of between 0 Hz to 30 Hz may correspond to haptic effects that produce tactile sensations of between 0 Hz to 60 Hz. In the example of FIG. 3, the modulation frequency $\Delta F$ associated with a fluttery haptic effect 302 that produces tactile sensations of between 0 and 20 Hz may be in the range between 0 Hz and 10 Hz, the modulation frequency $\Delta F$ associated with a grainy haptic effect 304 that produces tactile sensations of between 15 and 40 Hz may be a in the range between 7.5 Hz and 20 Hz, and the modulation frequency $\Delta F$ associated with a rough haptic effect 306 that produces tactile sensations of between 30 and 60 Hz may be associated with a range of modulation frequencies between 15 Hz and 30 Hz Within the range of modulation frequencies for each of haptic effects 302, 304, and 306, the tempo of the haptic effect as sensed by the user increases as the modulation frequency increases. For fluttery haptic effect 302, the rate of flutter felt by the user increases as the modulation frequency increases. For grainy haptic effect 304, the rate of beating felt by the user increases as the modulation frequency increases. For rough haptic effect 306, the haptic effect becomes smoother as felt by the user as the modulation frequency increases.

In general, the flutter sensation felt by the user at the modulation frequency of 6 Hz is the same whether the carrier frequency is at 120 Hz, 180 Hz, or 240 Hz. However, the skillful selection of the carrier frequency for a given modulation frequency may enhance how the low-frequency haptic effects are sensed by the user. For example, a haptic device that vibrates at a carrier frequency of 120 Hz may produce vibrations that feel softer to the user compared with the haptic device vibrating at a carrier frequency of 240 Hz. Thus, a haptic device that vibrates according to a vibration pattern resulting from combining a carrier frequency of 120 Hz with a modulation frequency of 6 Hz may produce vibrations that feel softer compared to a vibration pattern resulting from combining a carrier frequency of 240 Hz with a modulation frequency of 6 Hz that produces vibrations that the user may feel as being more piercing. Conversely, a haptic device that vibrates according to a vibration pattern resulting from combining a carrier frequency of 240 Hz with a modulation frequency of 14 Hz may produce vibrations that feel delicate and grainy to the user.

Figure 4:
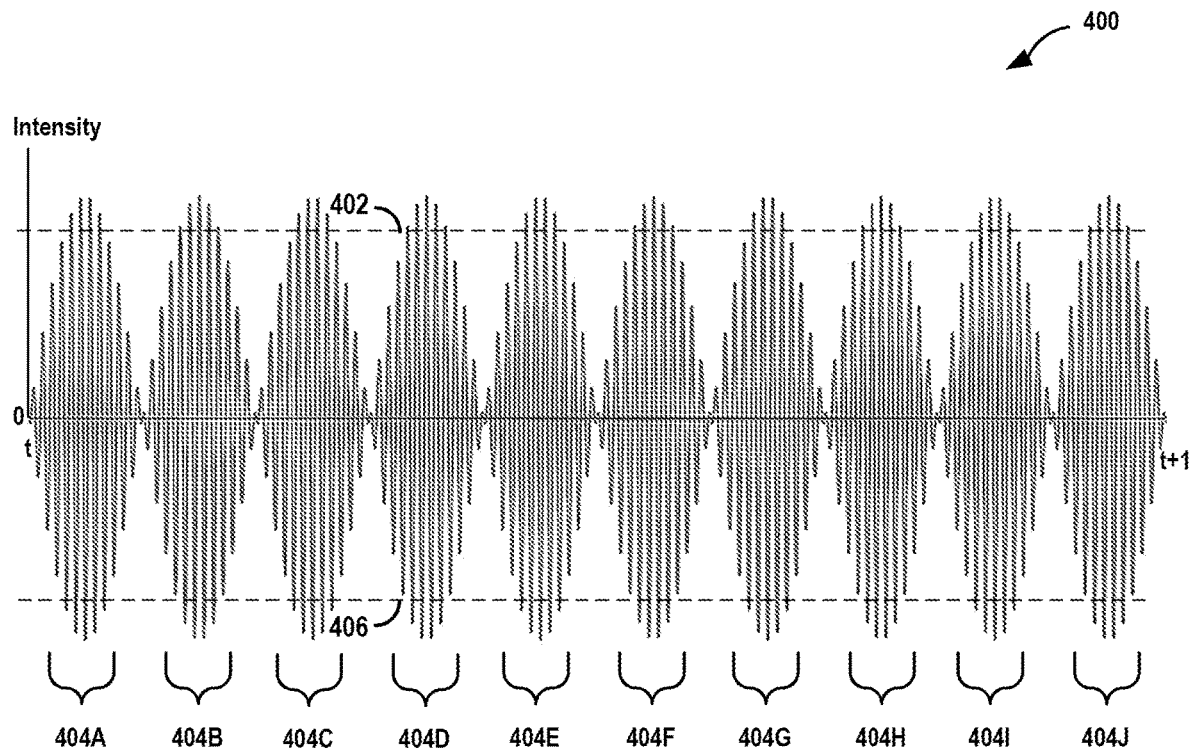
FIG. 4 is a conceptual diagram that illustrates a vibration pattern produced by combining a modulation frequency with a carrier frequency, in accordance with aspects of this disclosure.

FIG. 4 is a conceptual diagram that illustrates a vibration pattern produced by combining a modulation frequency with a carrier frequency, in accordance with aspects of this disclosure. As shown in FIG. 4, vibration pattern 400 that is produced by combining a carrier frequency of 120 Hz with a modulation frequency 5 Hz is illustrated as vibration intensities over a period of one second from t seconds to t+1 seconds. Because vibration pattern 400 has a vibration frequency that equals the carrier frequency, vibration pattern 400 may include 120 vibrations over the period of one second.

Vibration pattern 400 may include distinct bumps 404A-404J ("distinct bumps 404"). Each of distinct bumps 404 may be a grouping of one or more vibration intensities that are at or above vibration intensity threshold 402 and/or one or more vibration intensities that are at or below vibration intensity threshold 406, and distinct bumps 404 are separated from each other by one or more vibration intensities that are below vibration intensity threshold 402 and above vibration intensity threshold 406. Given the modulation frequency of 5 Hz, the frequency of distinct bumps 404 may be 10 Hz, such that 10 distinct bumps 404 are shown in FIG. 4 over a period of one second. As can be seen, by combining a modulation frequency of 5 Hz with a carrier frequency of 120 Hz, a computing device such as computing device 102 of FIG. 1 or computing device 202 of FIG. 2 may be able to output a vibration pattern 400 of 120 Hz associated with a haptic effect that produces a tactile sensation of vibrating at a frequency of 10 Hz that can be felt by a user of the computing device.

Figure 5:
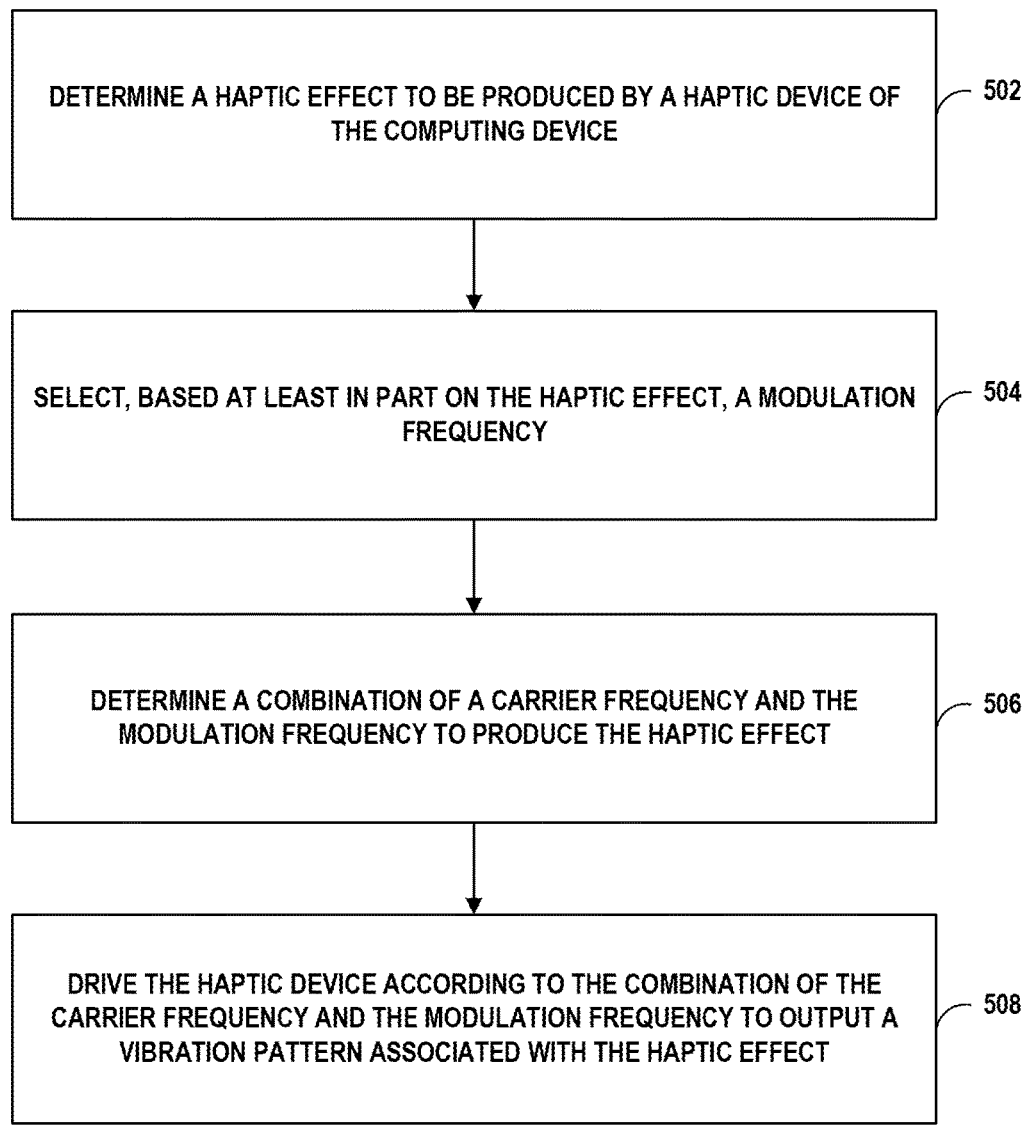
FIG. 5 is a flowchart illustrating example operations of an example computing device configured to output haptic feedback, in accordance with one or more aspects of the present disclosure.

FIG. 5 is a flowchart illustrating example operations of an example computing device configured to output haptic feedback, in accordance with one or more aspects of the present disclosure. For purposes of illustration only, the example operations are described below within the context of computing device 202 of FIG. 2.

As shown in FIG. 5, one or more processors 240 of computing device 202 may determine a haptic effect to be produced by a haptic device 214 of the computing device 202 (502). One or more processors 240 may select, based at least in part on the haptic effect, a modulation frequency (504). One or more processors 240 may determine a combination of a carrier frequency and the modulation frequency to produce the haptic effect (506). One or more processors 240 may drive the haptic device 214 according to the combination of the carrier frequency and the modulation frequency to output a vibration pattern associated with the haptic effect (508).

This disclosure includes the following examples:

Example 1: A method includes determining, by one or more processors of a computing device, a haptic effect to be produced by a haptic device of the computing device; selecting, by the one or more processors and based at least in part on the haptic effect, a modulation frequency; determining, by the one or more processors, a combination of a carrier frequency and the modulation frequency to produce the haptic effect; and driving, by the one or more processors, the haptic device according to the combination of the carrier frequency and the modulation frequency to output a vibration pattern associated with the haptic effect.

Example 2: The method of example 1, wherein driving the haptic device to output the vibration pattern associated with the haptic effect further comprises: driving, by the one or more processors, the haptic device to output the vibration pattern associated with the haptic effect at the carrier frequency to produce a tactile sensation of vibrating at or below 60 Hertz (Hz).

Example 3: The method of example 2, wherein driving the haptic device to output the vibration pattern associated with the haptic effect at the carrier frequency to produce the tactile sensation of vibrating at or below 60 Hz further comprises: driving, by the one or more processors, the haptic device to output the vibration pattern associated with the haptic effect at the carrier frequency to produce a tactile sensation of vibrating at twice the modulation frequency.

Example 4: The method of any of examples 1-3, wherein: the vibration pattern comprises a plurality of bumps; each bump in the plurality of bumps comprises a group of one or more vibrations each having a vibration intensity that is at or above a vibration intensity threshold; the plurality of bumps are separated by one or more vibrations each having a vibration intensity that is below the vibration intensity threshold; and a frequency of the plurality of bumps within the vibration pattern is twice the modulation frequency.

Example 5: The method of any of examples 1-4, wherein determining the combination of the carrier frequency and the modulation frequency further comprises: determining, by the one or more processors, a first frequency as a sum of the carrier frequency and the modulation frequency; determining, by the one or more processors, a second frequency as a subtraction of the modulation frequency from the carrier frequency; and determining, by the one or more processors, a resultant wave from mixing a first sinusoidal wave associated with the first frequency and a second sinusoidal wave associated with the second frequency.

Example 6: The method of example 5, wherein driving the haptic device according to the combination of the carrier frequency and the modulation frequency further comprises: driving, by the one or more processors, the haptic device to output the vibration pattern associated with the resultant wave, wherein vibration intensities of the vibration pattern over time correspond to amplitudes of the resultant wave over time.

Example 7: The method of any of examples 1 through 6, wherein selecting the modulation frequency further comprises selecting, by the one or more processors, the modulation frequency that is between 0 Hz and 30 Hz.

Example 8: The method of example 7, wherein the haptic effect is one of: a fluttery haptic effect associated with a modulation frequency range of between 0 Hz and 10 Hz, a grainy haptic effect associated with a modulation frequency range of between 8 Hz and 20 Hz, or a rough haptic effect associated with a modulation frequency range of between 15 Hz and 30 Hz.

Example 9: A computing device includes a haptic device; a memory; and one or more processors configured to: determine a haptic effect to be produced by the haptic device; select, based at least in part on the haptic effect, a modulation frequency; determine a combination of a carrier frequency and the modulation frequency to produce the haptic effect; and drive the haptic device according to the combination of the carrier frequency and the modulation frequency to output a vibration pattern associated with the haptic effect.

Example 10: The computing device of example 9, wherein to drive the haptic device to output the vibration pattern associated with the haptic effect, the one or more processors are further configured to: drive the haptic device to output the vibration pattern associated with the haptic effect at the carrier frequency to produce a tactile sensation of vibrating at or below 60 Hertz (Hz).

Example 11: The computing device of example 10, wherein to drive the haptic device to output the vibration pattern associated with the haptic effect at the carrier frequency to produce the tactile sensation of vibrating at or below 60 Hz, the one or more processors are further configured to: drive the haptic device to output the vibration pattern associated with the haptic effect at the carrier frequency to produce a tactile sensation of vibrating at twice the modulation frequency.

Example 12: The computing device of any of examples 9-11, wherein: the vibration pattern comprises a plurality of bumps; each bump in the plurality of bumps comprises a group of one or more vibrations each having a vibration intensity that is at or above a vibration intensity threshold; the plurality of bumps are separated by one or more vibrations each having a vibration intensity that is below the vibration intensity threshold; and a frequency of the plurality of bumps within the vibration pattern is twice the modulation frequency.

Example 13: The computing device of any of examples 9-12, wherein to determine the combination of the carrier frequency and the modulation frequency, the one or more processors are further configured to:

determine a first frequency as a sum of the carrier frequency and the modulation frequency; determine a second frequency as a subtraction of the modulation frequency from the carrier frequency; and determine a resultant wave from mixing a first sinusoidal wave associated with the first frequency and a second sinusoidal wave associated with the second frequency.

Example 14: The computing device of example 13, wherein to drive the haptic device according to the combination of the carrier frequency and the modulation frequency, the one or more processors are further configured to: drive the haptic device to output the vibration pattern associated with the resultant wave, wherein vibration intensities of the vibration pattern over time correspond to amplitudes of the resultant wave over time.

Example 15: The computing device of any of examples 9 through 14, wherein to select the modulation frequency, the one or more processors are further configured to select the modulation frequency that is between 0 Hz and 30 Hz.

Example 16: The computing device of example 15, wherein the haptic effect is one of: a fluttery haptic effect associated with a modulation frequency range of between 0 Hz and 10 Hz, a grainy haptic effect associated with a modulation frequency range of between 8 Hz and 20 Hz, or a rough haptic effect associated with a modulation frequency range of between 15 Hz and 30 Hz.

Example 17: A non-transitory computer-readable storage medium storing instructions that, when executed, cause one or more processors of a computing device to: determine a haptic effect to be produced by a haptic device of the computing device; select, based at least in part on the haptic effect, a modulation frequency; determine a combination of a carrier frequency and the modulation frequency to produce the haptic effect; and drive the haptic device according to the combination of the carrier frequency and the modulation frequency to output a vibration pattern associated with the haptic effect.

Example 18: The non-transitory computer-readable storage medium of example 17, wherein the instructions that cause the one or more processors to drive the haptic device to output the vibration pattern associated with the haptic effect further cause the one or more processors to: drive the haptic device to output the vibration pattern associated with the haptic effect at the carrier frequency to produce a tactile sensation of vibrating at or below 60 Hertz (Hz).

Example 19: The non-transitory computer-readable storage medium of example 18, wherein the instructions that cause the one or more processors to drive the haptic device to drive the haptic device to output the vibration pattern associated with the haptic effect at the carrier frequency to produce the tactile sensation of vibrating at or below 60 Hz further cause the one or more processors to: drive the haptic device to output the vibration pattern associated with the haptic effect at the carrier frequency to produce a tactile sensation of vibrating at twice the modulation frequency.

Example 20: The non-transitory computer-readable storage medium of any of examples 17-19, wherein: the vibration pattern comprises a plurality of bumps; each bump in the plurality of bumps comprises a group of one or more vibrations each having a vibration intensity that is at or above a vibration intensity threshold; the plurality of bumps are separated by one or more vibrations each having a vibration intensity that is below the vibration intensity threshold; and a frequency of the plurality of bumps within the vibration pattern is twice the modulation frequency.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples of the disclosure have been described. Any combination of the described systems, operations, or functions is contemplated. These and other examples are within the scope of the following claims.

The invention claimed is:

1. A method comprising:
   determining, by one or more processors of a computing device, a haptic effect to be produced by a haptic device of the computing device;
   selecting, by the one or more processors and based at least in part on the haptic effect, a modulation frequency;
   determining, by the one or more processors, a combination of a carrier frequency and the modulation frequency to produce the haptic effect; and
   driving, by the one or more processors, the haptic device according to the combination of the carrier frequency and the modulation frequency to output a vibration pattern associated with the haptic effect.

2. The method of claim 1, wherein driving the haptic device to output the vibration pattern associated with the haptic effect further comprises:
   driving, by the one or more processors, the haptic device to output the vibration pattern associated with the haptic effect at the carrier frequency to produce a tactile sensation of vibrating at or below 60 Hertz (Hz).

3. The method of claim 2, wherein driving the haptic device to output the vibration pattern associated with the haptic effect at the carrier frequency to produce the tactile sensation of vibrating at or below 60 Hz further comprises:
   driving, by the one or more processors, the haptic device to output the vibration pattern associated with the haptic effect at the carrier frequency to produce a tactile sensation of vibrating at twice the modulation frequency.

4. The method of claim 1, wherein:
   the vibration pattern comprises a plurality of bumps;
   each bump in the plurality of bumps comprises a group of one or more vibrations each having a vibration intensity that is at or above a vibration intensity threshold;
   the plurality of bumps are separated by one or more vibrations each having a vibration intensity that is below the vibration intensity threshold; and
   a frequency of the plurality of bumps within the vibration pattern is twice the modulation frequency.

5. The method of claim 1, wherein determining the combination of the carrier frequency and the modulation frequency further comprises:
   determining, by the one or more processors, a first frequency as a sum of the carrier frequency and the modulation frequency;
   determining, by the one or more processors, a second frequency as a subtraction of the modulation frequency from the carrier frequency; and
   determining, by the one or more processors, a resultant wave from mixing a first sinusoidal wave associated with the first frequency and a second sinusoidal wave associated with the second frequency.

6. The method of claim 5, wherein driving the haptic device according to the combination of the carrier frequency and the modulation frequency further comprises:
   driving, by the one or more processors, the haptic device to output the vibration pattern associated with the resultant wave, wherein vibration intensities of the vibration pattern over time correspond to amplitudes of the resultant wave over time.

7. The method of claim 1, wherein selecting the modulation frequency further comprises selecting, by the one or more processors, the modulation frequency that is between 0 Hz and 30 Hz.

8. The method of claim 7, wherein the haptic effect is one of: a fluttery haptic effect associated with a first modulation frequency range of between 0 Hz and 10 Hz, a grainy haptic effect associated with a second modulation frequency range of between 8 Hz and 20 Hz, or a rough haptic effect associated with a third modulation frequency range of between 15 Hz and 30 Hz.

9. A computing device comprising:
   a haptic device;
   a memory; and
   one or more processors configured to:
      determine a haptic effect to be produced by the haptic device;
      select, based at least in part on the haptic effect, a modulation frequency;
      determine a combination of a carrier frequency and the modulation frequency to produce the haptic effect; and
      drive the haptic device according to the combination of the carrier frequency and the modulation frequency to output a vibration pattern associated with the haptic effect.

10. The computing device of claim 9, wherein to drive the haptic device to output the vibration pattern associated with the haptic effect, the one or more processors are further configured to:
    drive the haptic device to output the vibration pattern associated with the haptic effect at the carrier frequency to produce a tactile sensation of vibrating at or below 60 Hertz (Hz).

11. The computing device of claim 10, wherein to drive the haptic device to output the vibration pattern associated with the haptic effect at the carrier frequency to produce the tactile sensation of vibrating at or below 60 Hz, the one or more processors are further configured to:
    drive the haptic device to output the vibration pattern associated with the haptic effect at the carrier frequency to produce a tactile sensation of vibrating at twice the modulation frequency.

12. The computing device of claim 9, wherein:
    the vibration pattern comprises a plurality of bumps;
    each bump in the plurality of bumps comprises a group of one or more vibrations each having a first vibration intensity that is at or above a vibration intensity threshold;
    the plurality of bumps are separated by one or more vibrations each having a second vibration intensity that is below the vibration intensity threshold; and
    a frequency of the plurality of bumps within the vibration pattern is twice the modulation frequency.

13. The computing device of claim 9, wherein to determine the combination of the carrier frequency and the modulation frequency, the one or more processors are further configured to:

determine a first frequency as a sum of the carrier frequency and the modulation frequency;
determine a second frequency as a subtraction of the modulation frequency from the carrier frequency; and
determine a resultant wave from mixing a first sinusoidal wave associated with the first frequency and a second sinusoidal wave associated with the second frequency.

14. The computing device of claim 13, wherein to drive the haptic device according to the combination of the carrier frequency and the modulation frequency, the one or more processors are further configured to:
drive the haptic device to output the vibration pattern associated with the resultant wave, wherein vibration intensities of the vibration pattern over time correspond to amplitudes of the resultant wave over time.

15. The computing device of claim 9, wherein to select the modulation frequency, the one or more processors are further configured to select the modulation frequency that is between 0 Hz and 30 Hz.

16. The computing device of claim 15, wherein the haptic effect is one of: a fluttery haptic effect associated with a first modulation frequency range of between 0 Hz and 10 Hz, a grainy haptic effect associated with a second modulation frequency range of between 8 Hz and 20 Hz, or a rough haptic effect associated with a third modulation frequency range of between 15 Hz and 30 Hz.

17. A non-transitory computer-readable storage medium storing instructions that, when executed, cause one or more processors of a computing device to:
determine a haptic effect to be produced by a haptic device of the computing device;
select, based at least in part on the haptic effect, a modulation frequency;
determine a combination of a carrier frequency and the modulation frequency to produce the haptic effect; and
drive the haptic device according to the combination of the carrier frequency and the modulation frequency to output a vibration pattern associated with the haptic effect.

18. The non-transitory computer-readable storage medium of claim 17, wherein the instructions that cause the one or more processors to drive the haptic device to output the vibration pattern associated with the haptic effect further cause the one or more processors to:
drive the haptic device to output the vibration pattern associated with the haptic effect at the carrier frequency to produce a tactile sensation of vibrating at or below 60 Hertz (Hz).

19. The non-transitory computer-readable storage medium of claim 18, wherein the instructions that cause the one or more processors to drive the haptic device to output the vibration pattern associated with the haptic effect at the carrier frequency to produce the tactile sensation of vibrating at or below 60 Hz further cause the one or more processors to:
drive the haptic device to output the vibration pattern associated with the haptic effect at the carrier frequency to produce a tactile sensation of vibrating at twice the modulation frequency.

20. The non-transitory computer-readable storage medium of claim 17, wherein:
the vibration pattern comprises a plurality of bumps;
each bump in the plurality of bumps comprises a group of one or more vibrations each having a first vibration intensity that is at or above a vibration intensity threshold;
the plurality of bumps are separated by one or more vibrations each having a second vibration intensity that is below the vibration intensity threshold; and
a frequency of the plurality of bumps within the vibration pattern is twice the modulation frequency.

* * * * *